(12) United States Patent
Cavicchia et al.

(10) Patent No.: US 10,987,715 B2
(45) Date of Patent: Apr. 27, 2021

(54) TOOL STORAGE SYSTEM, PRODUCTION PLANT AND METHOD FOR MANIPULATING WITH SUCH A TOOL STORAGE SYSTEM

(71) Applicant: TRUMPF Maschinen Austria GmbH & Co. KG., Pasching (AT)

(72) Inventors: Luigi Cavicchia, Trofarello (IT); Fabio Tomasin, Rivoli (IT); Andrea Tonda Roch, Turin (IT); Roberto Veronese, Chieri (IT); Giovanni Vidotto, Chieri (IT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 407 days.

(21) Appl. No.: 16/099,864

(22) PCT Filed: May 24, 2017

(86) PCT No.: PCT/AT2017/060137
§ 371 (c)(1),
(2) Date: Nov. 8, 2018

(87) PCT Pub. No.: WO2017/201559
PCT Pub. Date: Nov. 30, 2017

(65) Prior Publication Data
US 2020/0316665 A1    Oct. 8, 2020

(30) Foreign Application Priority Data
May 25, 2016  (AT) .............................. A 50474/2016

(51) Int. Cl.
*B21D 5/02*    (2006.01)
*B21D 37/14*   (2006.01)
(Continued)

(52) U.S. Cl.
CPC ......... *B21D 5/0254* (2013.01); *B21D 37/145* (2013.01); *B21D 5/006* (2013.01);
(Continued)

(58) Field of Classification Search
CPC ........ Y10T 483/1729; Y10T 483/1731; B21D 5/0254; B21D 37/14; B21D 37/145;
(Continued)

(56) References Cited

U.S. PATENT DOCUMENTS 4,188,815 A * 2/1980 Mizushima .......... B21D 5/0254
483/29
4,680,955 A * 7/1987 Sakamoto ................ B21D 5/02
100/918
(Continued)

FOREIGN PATENT DOCUMENTS

CN    103317753 A    9/2013
CN    104384358 A    3/2015
(Continued)

OTHER PUBLICATIONS

International Search Report of PCT/AT2017/060137, dated Sep. 22, 2017.

*Primary Examiner* — Erica E Cadugan
*Assistant Examiner* — Michael Vitale
(74) *Attorney, Agent, or Firm* — Collard & Roe, P.C.

(57) ABSTRACT

The invention relates to a tool storage system (32) as well as to a production facility (1) for free-form bending of workpieces (2) made from a metal sheet, by means of a bending press (3), comprising a tool storage unit (30), a tool manipulation unit (31), and a provisioning unit (55) having provisioning rails (56, 57). The tool storage unit (30) has an upper and lower storage rail (34, 35), which are disposed spaced apart from one another at a vertical distance, as well as locally fixed in place relative to one another. The tool
(Continued)

Figure 1:
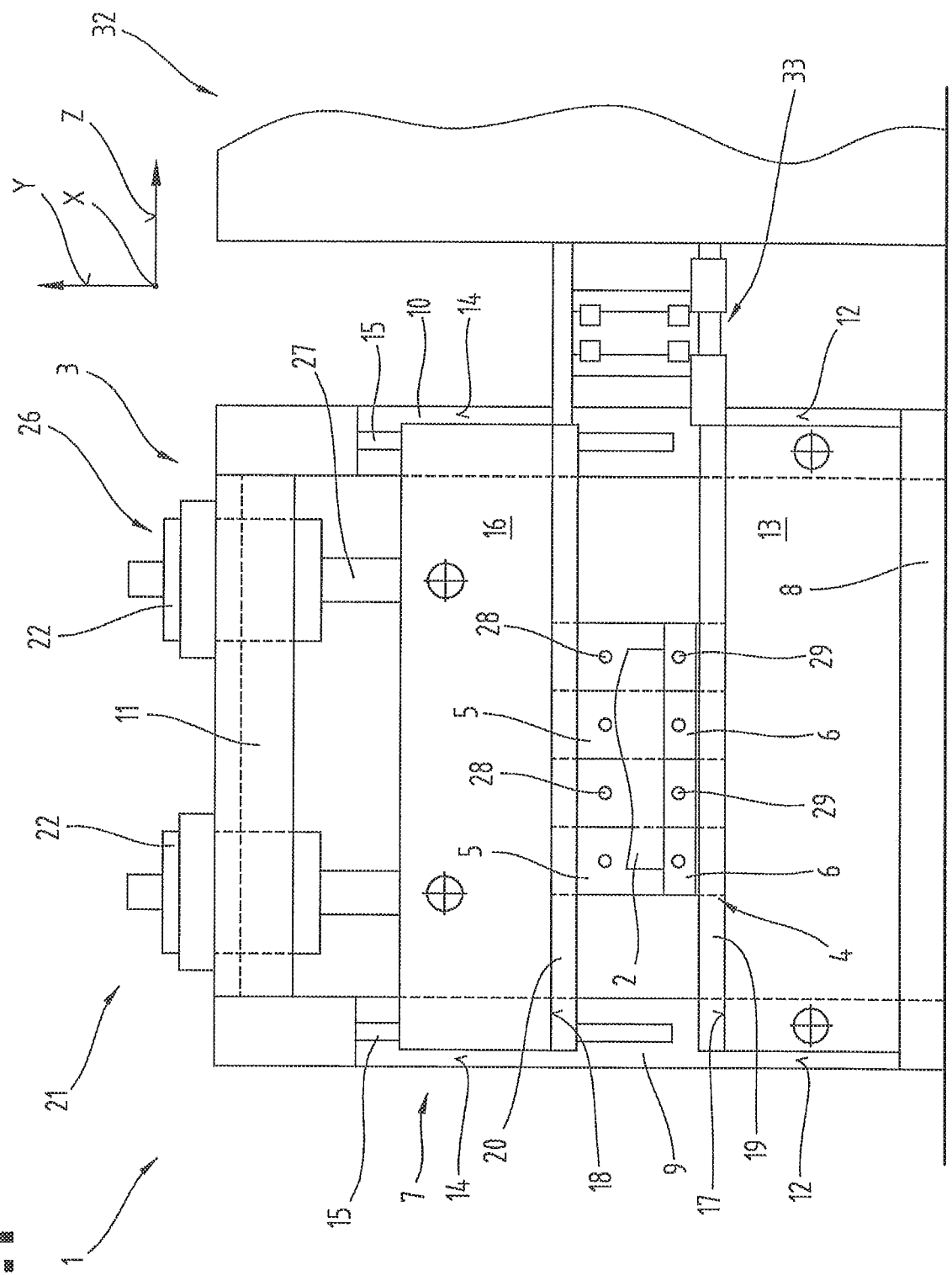

manipulation unit (31) has tool manipulation devices (36, 37), wherein each of the same comprises a working rail (38, 42), an auxiliary rail (39, 43), a drawing-in device (40, 44), as well as a pushing-out device (41, 45). Each of the tool manipulation devices (36, 37) can be displaced laterally next to the storage rails (34, 35), along a longitudinal guide arrangement (46, 47). Furthermore, the invention also comprises a method for manipulation of at least one bending tool (4) in such a tool storage system (32).

22 Claims, 5 Drawing Sheets

(51) Int. Cl.
  *B21D 5/00* (2006.01)
  *B23Q 3/155* (2006.01)
(52) U.S. Cl.
  CPC ........ *B21D 5/0236* (2013.01); *B23Q 3/15526* (2013.01); *B23Q 3/15573* (2013.01); *Y10T 483/1731* (2015.01)
(58) Field of Classification Search
  CPC .................. B23Q 3/155; B23Q 3/15503; B23Q 3/15513; B23Q 3/1552; B23Q 3/15526; B23Q 3/1556; B23Q 3/15573; B23Q 2003/15528; B23Q 2003/1553
  USPC .................. 483/28, 29; 72/446, 447, 448
  See application file for complete search history.

(56) References Cited

U.S. PATENT DOCUMENTS

| | | | | |
|---|---|---|---|---|
| 4,945,629 A | * | 8/1990 | Schafft | B21D 37/145 483/29 |
| 5,168,745 A | * | 12/1992 | Miyagawa | B21D 5/02 483/29 |
| 5,364,328 A | * | 11/1994 | Takahama | B29C 45/1756 483/28 |
| 5,366,431 A | * | 11/1994 | Smith | B21D 5/02 483/1 |
| 9,975,161 B2 | | 5/2018 | Sato | |
| 2015/0174633 A1 | * | 6/2015 | Sato | B21D 37/145 483/1 |
| 2017/0165734 A1 | * | 6/2017 | Denkmeier | B21D 37/14 |
| 2017/0297073 A1 | | 10/2017 | Sato | |

FOREIGN PATENT DOCUMENTS

| | | | | |
|---|---|---|---|---|
| EP | 0 308 363 A1 | | 3/1989 | |
| EP | 2 865 458 A1 | | 4/2015 | |
| JP | S57-181725 A | | 11/1982 | |
| JP | 61150727 A | * | 7/1986 | ........... B21D 37/147 |
| JP | 61154722 A | * | 7/1986 | ........... B21D 37/14 |
| JP | H03-14532 B2 | | 2/1991 | |
| JP | 05084520 A | * | 6/1993 | ........... B21D 5/0254 |
| JP | H0584414 U | * | 11/1993 | |
| JP | 06304660 A | * | 11/1994 | ........... B21D 5/0254 |
| JP | 2595929 Y2 | | 6/1999 | |
| JP | 2009-018323 A | | 1/2009 | |
| WO | 2012/151601 A1 | | 11/2012 | |
| WO | 2015/077810 A1 | | 6/2015 | |
| WO | 2016/063579 A1 | | 4/2016 | |
| WO | WO-2016109862 A1 | * | 7/2016 | ........... B21D 37/04 |

\* cited by examiner

TOOL STORAGE SYSTEM, PRODUCTION PLANT AND METHOD FOR MANIPULATING WITH SUCH A TOOL STORAGE SYSTEM

CROSS REFERENCE TO RELATED APPLICATIONS

This application is the National Stage of PCT/AT2017/060137 filed on May 24, 2017, which claims priority under 35 U.S.C. § 119 of Austrian Application No. A50474/2016 filed on May 25, 2016, the disclosure of which is incorporated by reference. The international application under PCT article 21 (2) was not published in English.

The invention relates to a tool storage system for a production facility, in particular for free-form bending of workpieces made from a metal sheet, by means of a bending press, to a production facility for free-form bending of workpieces made from a metal sheet, using such a tool storage system, as well as to a method for manipulation of at least one bending tool in a tool storage system of a production facility.

A production facility for free-form bending of workpieces made from a metal sheet has become known from WO 2012/151601 A1, in which facility a tool storage unit for different bending tools is disposed behind the bending press with its bending beams. The bending punches of the bending tool are suspended, and the bending dies are in a standing position, and also held in their position of use. At least one rear stop unit is provided for a tool replacement, which unit has a carrier that can be pivoted about a vertical axis, which carrier has a rear stop at one end and a manipulation device at the other end for the tool replacement. Individual components of the bending tool that is no longer required can be replaced with components that are currently required, by means of the combined displacement movement and pivoting movement of the carrier. In this regard, the tool replacement process is rather complicated and no bending process is possible for an extended period of time.

Further known tool storage units can be formed by a paternoster elevator system, in which the respective tool component is brought up to a manipulation device, for a transfer position, and there, this device performs either acquisition or return of the tool component. Here, too, a tool replacement process that lasts for a rather long time is required so as to be able to make a switch. As a result, here, too, no bending process can be carried out for a longer period of time.

It was the task of the present invention to overcome the disadvantages of the state of the art and to make available an device, a facility, as well as a method, by means of which simple and, above all, rapid loading as well as rapid replacement of bending tools can be undertaken.

This task is accomplished by means of a tool storage system in accordance with the claims.

The tool storage system configured according to the invention can be used in a production facility, in particular for free-form bending of workpieces made from a metal sheet, by means of a bending press, and comprises at least one tool storage unit for holding at least one bending tool, wherein the bending tool has at least one bending punch and at least one bending die, at least one tool manipulation unit, at least one provisioning unit having at least an upper and/or lower provisioning rail, wherein the tool storage unit comprises at least one upper storage rail and at least one lower storage rail, which at least one upper storage rail and at least one lower storage rail are disposed spaced apart from one another at a vertical distance, as well as locally fixed in place relative to one another, and in this regard, the at least one upper storage rail defines an upper storage plane, and the at least one lower storage rail defines a lower storage plane, the tool manipulation unit has at least one upper tool manipulation device and at least one lower tool manipulation device, wherein the at least one upper tool manipulation device is disposed in the region of a face side of the at least one upper storage rail, and the at least one lower tool manipulation device is disposed in the region of a face side of the at least one lower storage rail, the at least one upper tool manipulation device has at least one upper working rail and at least one upper auxiliary rail disposed laterally relative to the former and running parallel with regard to the upper working rail, and furthermore comprises at least one upper drawing-in device for at least one bending punch to be held as well as at least one upper pushing-out device for at least one bending punch to be discharged, the at least one lower tool manipulation device has at least one lower working rail and at least one lower auxiliary rail disposed laterally relative to the former and running parallel with regard to the lower working rail, and furthermore comprises at least one lower drawing-in device for at least one bending die to be held, as well as at least one lower pushing-out device for at least one bending die to be discharged, the at least one upper tool manipulation device can be displaced parallel with regard to the upper storage plane, as well as in the vertical direction with regard to the longitudinal expanse of the at least one upper storage rail, along an upper longitudinal guide arrangement, the at least one lower tool manipulation device can be displaced parallel with regard to the lower storage plane, as well as in the vertical direction with regard to the longitudinal expanse of the at least one lower storage rail, along a lower longitudinal guide arrangement.

The advantage achieved in this way lies in that by means of the lower and upper storage rails, which are disposed so that they are positioned in a fixed location and spaced apart from one another in the vertical direction, a precise storage plane is defined by the rails, in each instance. Furthermore, all the relocation processes of the individual components of the bending tool can be carried out by means of the orientation of the individual rails of the tool storage unit, which orientation preferably runs parallel with regard to the pressing beams and the tool holders disposed on them, using a simple straight-line movement direction. Furthermore, since each of the storage planes of the storage rails has its own tool manipulation device for the relocation processes or provisioning processes assigned to it, even greater flexibility as well as more rapid provisioning, independent of one another, can be achieved, and thereby more rapid replacement of bending tools can be carried out. Furthermore, by means of providing devices that can be activated independent of one another, for drawing in components of the bending tool onto the respective tool manipulation device, as well as for discharging the same from the respective tool manipulation device, in this way relocation times that can be carried out easily and rapidly can be achieved.

Furthermore, it can be advantageous if multiple upper storage rails as well as multiple lower storage rails are provided, and the upper storage rails as well as the lower storage rails are oriented to run parallel to one another in each of the storage planes, wherein the two storage planes defined by the respective storage rails each have a horizontal orientation. By means of providing a plurality of upper storage rails as well as a plurality of lower storage rails, the storage capacity of the tool storage unit can be adapted in accordance with the requirements. Furthermore, by means of the precise and, above all, fixed orientation of the individual storage rails in each of the storage planes, the hand-over or take-over position can be approached precisely, with a simpler displacement movement and positioning of the respective tool manipulation device with regard to the respective transfer unit rail.

Another embodiment is characterized in that the upper longitudinal guide arrangement has at least a first upper guide track and at least a second upper guide track. In this way, by means of dividing the longitudinal guide arrangement up into at least two guide tracks, a better support effect for the displacement movement can be achieved, and furthermore, even greater flexibility can be achieved for each of the tool manipulation devices.

A further possible embodiment has the characteristics that the at least one upper working rail and the at least one upper auxiliary rail of the upper tool manipulation device form an upper construction unit, and the upper construction unit can be displaced on the at least one first upper guide track of the upper longitudinal guide arrangement by means of a drive. In this way, by means of forming a cohesive construction unit in connection with the respective separate guide tracks, a displacement movement of this separate construction unit, which movement is independent of the drawing-in device, can be made possible.

A further embodiment provides that the upper drawing-in device of the upper tool manipulation device can be displaced on the at least one second upper guide track of the upper longitudinal guide arrangement. In this way, by means of the separate guidance or support of the drawing-in device by the respective construction unit, relative displacement of individual components of the respective tool manipulation device relative to one another can be made possible. Furthermore, in this way multiple placement or multiple provisioning of individual components of the respective tool manipulation device can also be prevented.

Another embodiment is characterized in that at least one upper coupling device is provided between the upper construction unit and the upper drawing-in device. In this way, by means of providing a separate coupling device, a common displacement movement of the construction unit, which serves to hold components of the bending tool, as well as of the drawing-in device assigned to this unit, can be made possible. In particular, by means of the uncoupling of the coupling device, a displacement movement that is independent of the drawing-in device can be made possible for the construction unit.

A further preferred embodiment is characterized in that the upper drawing-in device has at least one upper locking means, and the upper drawing-in device is held locally fixed in position when the at least one upper locking means is situated in the locking position with regard to the at least one second upper guide track of the upper longitudinal guide arrangement. If the locking means is situated in its locking position, locally fixed positioning of the drawing-in device relative and with regard to the second guide track can be made possible. In this way, when the coupling device is uncoupled, it can be ensured that the drawing-in device is held precisely positioned with regard to one of the storage rails or one of the provisioning rails, and optionally, either the working rail or the auxiliary rail can be brought into an aligned orientation with one of the storage rails or one of the provisioning rails.

Furthermore, it can be advantageous if the at least one upper pushing-out device is disposed on the upper construction unit, and has an upper slide piece that can be displaced in the direction of the longitudinal expanse of the at least one upper working rail as well as the at least one upper auxiliary rail, and if at least one setting finger is disposed on the upper slide piece, which at least one setting finger can be changed from a working position, in which it is in engagement with the at least one bending punch, into a rest position in which it is out of engagement with the at least one bending punch. In this way, discharge or pushing out of components of the bending tool can be made possible by means of the pushing-out device, independent of the drawing-in device, depending on the activation and the related bringing into engagement of the setting finger with the bending punch.

Another alternative embodiment is characterized in that an upper pusher is mounted so as to be guided on the upper construction unit, in the parallel direction with regard to the at least one upper working rail, which upper pusher can be changed from an extended position in which it projects beyond the upper construction unit in the direction toward the tool storage unit, into a rest position in which it is situated within the upper construction unit. By means of providing an additional pusher on the construction unit, an additional displacement movement of individual components of the bending tool, either in the region of the provisioning unit or in the region of the tool storage unit, can thereby be achieved.

A further possible and, if applicable, alternative embodiment has the characteristics that a first upper coupling element is disposed on the upper slide piece, which first upper coupling element can be brought into a coupling position in which it is in engagement with a second upper coupling element disposed on the upper pusher. By means of providing an additional coupling element on the slide piece, it is thereby possible to do without an additional drive device for the drive movement of the pusher. In this way, it is possible to make do with few components, and nevertheless, longitudinal adjustment of the pusher relative to the construction unit can be made possible.

A further embodiment provides that at least one upper setting means, in particular a drive wheel, intermediate wheel, idler wheel or guide wheel, is disposed on the at least one upper working rail and/or the at least one upper auxiliary rail, and that the at least one upper setting means is disposed in an end region of the at least one upper working rail and/or the at least one upper auxiliary rail, which region faces the tool storage unit. In this way, by activation of the setting means, projection or protrusion of components of the bending tool held in the construction unit can be prevented. In this way, collisions of parts of the bending tool, during a displacement movement along the tool storage unit, with the storage rails disposed there, or in the region of the provisioning rail, can be prevented.

Another embodiment is characterized in that the lower longitudinal guide has at least one first lower guide track and at least one second lower guide track. In this way, by means of dividing the longitudinal guide arrangement into at least two guide tracks, a better support effect for the displacement movement can be achieved, and furthermore, even greater flexibility can be achieved for each of the tool manipulation devices.

A further preferred embodiment is characterized in that the at least one lower working rail and the at least one lower auxiliary rail of the lower tool manipulation devices form a lower construction unit, and the lower construction unit can be displaced on the at least one first lower guide track of the lower longitudinal guide arrangement by means of a drive. In this way, by forming a cohesive construction unit in connection with the respective separate guide rails, a displacement movement of this separate construction unit can be made possible, which movement is independent of the drawing-in device.

Furthermore, it can be advantageous if the lower drawing-in device of the lower tool manipulation device can be displaced on the at least one second lower guide track of the lower longitudinal guide arrangement. In this way, by means of the guidance or mounting of the drawing-in device separate from the respective construction unit, relative displacement of individual components of the respective tool manipulation device relative to one another can be made possible. Furthermore, however, multiple placement or multiple provisioning of individual components of the respective tool manipulation device can also be prevented in this way.

Another embodiment is characterized in that at least one lower coupling device is provided between the lower construction unit and the lower drawing-in device. In this way, by means of providing a separate coupling device, a common displacement movement of the construction unit, which serves to hold components of the bending tool, as well as of the drawing-in device assigned to it, can be made possible. By means of uncoupling the coupling device, a displacement movement that is independent of the drawing-in device can be made possible for the construction unit, in particular.

A further possible embodiment has the characteristics that the lower drawing-in device has at least one lower locking means, and that the lower drawing-in device is held locally fixed in position when the at least one lower locking means is situated in a locking position relative and with regard to the at least one second lower guide track of the lower longitudinal guide arrangement. If the locking means is in its locking position, locally fixed positioning of the drawing-in device relative and with regard to the second guide track can be made possible. In this way, it can be ensured, when the coupling device is uncoupled, that the drawing-in device is held precisely positioned with regard to one of the storage rails or one of the provisioning rails, and optionally either the working rail or the auxiliary rail can be brought into flush alignment with one of the storage rails or one of the provisioning rails.

A further embodiment provides that the at least one lower pushing-out device is disposed on the lower construction unit, and has a lower slide piece that can be displaced in the direction of the longitudinal expanse of the at least one lower working rail, as well as the at least one lower auxiliary rail, and that at least one setting finger is disposed on the lower slide piece, which at least one setting finger can be changed from a working position, in which it is situated in engagement with the at least one bending die, into a rest position, in which it is situated out of engagement with the at least one bending die. In this way, by means of the pushing-out device, discharge or pushing out of components of the bending tool can be made possible, independent of the drawing-in device, depending on the activation and the related bringing into engagement of the setting finger with the bending die.

Another embodiment is characterized in that a lower pusher is mounted on the lower construction unit, guided in the parallel direction with regard to the at least one lower working rail, which lower pusher can be changed from an extended position in which it projects beyond the lower construction unit in the direction toward the tool storage unit, into a rest position in which it is situated within the lower construction unit. By means of providing an additional pusher on the construction unit, an additional displacement movement of individual components of the bending tool, either in the region of the provisioning unit or in the region of the tool storage unit, can thereby be made possible.

A further preferred embodiment is characterized in that a first lower coupling element is disposed on the lower slide piece, which first lower coupling element can be brought into a coupling position in which it is in engagement with a second lower coupling element disposed on the lower pusher. By means of providing an additional coupling element on the slide piece, it is thereby possible to do without an additional drive device for the drive movement of the pusher. In this way, it is possible to make do with few components, and nevertheless, longitudinal adjustment of the pusher relative to the construction unit can be made possible.

Furthermore, it can be advantageous if at least one lower setting means, in particular a drive wheel, intermediate wheel, idler wheel or guide wheel, is disposed on the at least one lower working rail and/or the at least one lower auxiliary rail, and that the at least one lower setting means is disposed in an end region of the at least one lower working rail and/or the at least one lower auxiliary rail, which region faces the tool storage unit. In this way, by activation of the setting means, projection or protrusion of components of the bending tool held in the construction unit can be prevented. In this way, collisions of parts of the bending tool, during a displacement movement along the tool storage unit, with the storage rails disposed there, or in the region of the provisioning rail, can be prevented.

Furthermore, the task of the invention can also be accomplished by means of a production facility for free-form bending of workpieces made from a metal sheet. In this regard, the production facility can comprise the following facility parts:
  at least one bending press,
  a tool storage system that has at least one tool storage unit for holding at least one bending tool, as well as at least one tool manipulation unit.

It would also be possible to accomplish the task of the invention by means of a method for manipulation of at least one bending tool in a tool storage system of a production facility, in particular for free-form bending of workpieces made from a metal sheet, by means of a bending press. In this regard, at least one tool storage unit can be provided for holding the at least one bending tool comprising at least one bending punch and at least one bending die. The at least one bending tool is manipulated by means of at least one tool manipulation unit between the at least one tool storage unit and at least one provisioning unit having at least one upper and/or lower provisioning rail. In this regard, the method of procedure can be such that
  the tool storage unit is formed by at least one upper storage rail and at least one lower storage rail, and the at least one upper storage rail and the at least one lower storage rail are disposed spaced apart from one another at a vertical distance, as well as locally fixed in place relative to one another, wherein an upper storage plane is defined by the at least one upper storage rail, and a lower storage plane is defined by the at least one lower storage rail, the tool manipulation unit is formed by at least one upper tool manipulation device and by at least one lower tool manipulation device, wherein the at least one upper tool manipulation device is disposed in the region of a face side of the at least one upper storage rail, and the at least one lower tool manipulation device is disposed in the region of a face side of the at least one lower storage rail, the at least one upper tool manipulation device is formed by at least one upper working rail and by at least one upper auxiliary rail disposed laterally relative to the former and running parallel with regard to the upper working rail, and the upper tool manipulation device furthermore comprises at least one upper drawing-in device for at least one bending punch to be held, as well as at least one upper pushing-out device for at least one bending punch to be discharged, the at least one lower tool manipulation device is formed by at least one lower working rail and by at least one lower auxiliary rail disposed laterally relative to the former and running parallel with regard to the lower working rail, and the lower tool manipulation device furthermore comprises at least one lower drawing-in device for at least one bending die to be held, as well as at least one lower pushing-out device for at least one bending die to be discharged, the at least one upper tool manipulation device can be displaced parallel with regard to the upper storage plane, as well as in the vertical direction with regard to the longitudinal expanse of the at least one upper storage rail, along an upper longitudinal guide arrangement, the at least one lower tool manipulation device can be displaced parallel with regard to the lower storage plane, as well as in the vertical direction with regard to the longitudinal expanse of the at least one lower storage rail, along a lower longitudinal guide arrangement, the assembly of a bending tool from multiple bending punches and multiple bending dies is carried out by means of the tool manipulation devices independent of one another, in each instance, at least one of the required and selected bending punches is displaced to its at least one upper working rail by means of the at least one upper tool manipulation device, from one of the upper storage rails, wherein at least one bending punch that is not required is displaced to its at least one upper auxiliary rail, from the same upper storage rail, by means of the at least one upper tool manipulation device, and/or at least one of the required and selected bending dies is displaced to its at least one lower working rail by means of the at least one lower tool manipulation device, from one of the lower storage rails, wherein at least one bending die that is not required is displaced to its at least one lower auxiliary rail, from the same lower storage rail, by means of the at least one lower tool manipulation device.

It is advantageous, in this regard, that in this way, in each of the storage planes, independent of one another, the bending punches or bending dies that are required, in each instance, can be removed by means of the tool manipulation devices. Depending on the placement and storage location of the bending punches or bending dies, attention must be paid to the corresponding sequence in the assembly or configuration of the required bending punches and bending dies in the case of each of the tool manipulation devices. In most cases, this/these bending punch/punches or bending die/dies is/are not situated in the immediate take-over region and therefore on the edge side in the tool storage unit, in particular in the storage rail/rails, but rather at a storage location at a distance from it/them. In this way, at least one bending punch that is not required or at least one bending die that is not required is present between the bending punch/punches or bending die/dies required for forming the bending tool and the respective tool manipulation device, in the removal direction.

The bending punches and bending dies that are required, in each instance, are supposed to be displaced to the working rail provided for this purpose, in the correct sequence for later provisioning. If bending punches or bending dies that are not currently required were to be situated on the same storage rail, the respective auxiliary rail of the respective tool manipulation device is brought into a take-over position oriented with regard to the storage rail. In this way, the bending punch/punches or bending die/dies that is/are currently not required can be temporarily stored on the corresponding auxiliary rail. By means of the placement of working rail and auxiliary rail directly next to one another in the case of each of the tool manipulation devices, the displacement paths of the same can thereby be kept very short. As a result, the time period of manipulation for the assembly of bending tools or tool sets can be minimized. As necessary, the bending punch/punches or bending die/dies temporarily stored on the auxiliary rail/rails can be brought back to a free storage location in the tool storage unit. As a result, sufficient auxiliary storage space is again available on the tool manipulation device. In this regard, the manipulation procedures can be carried out by the drawing-in device of the pushing-out device, depending on the adjustment direction.

For a better understanding of the invention, it will be explained in greater detail using the following figures.

Figure 2:
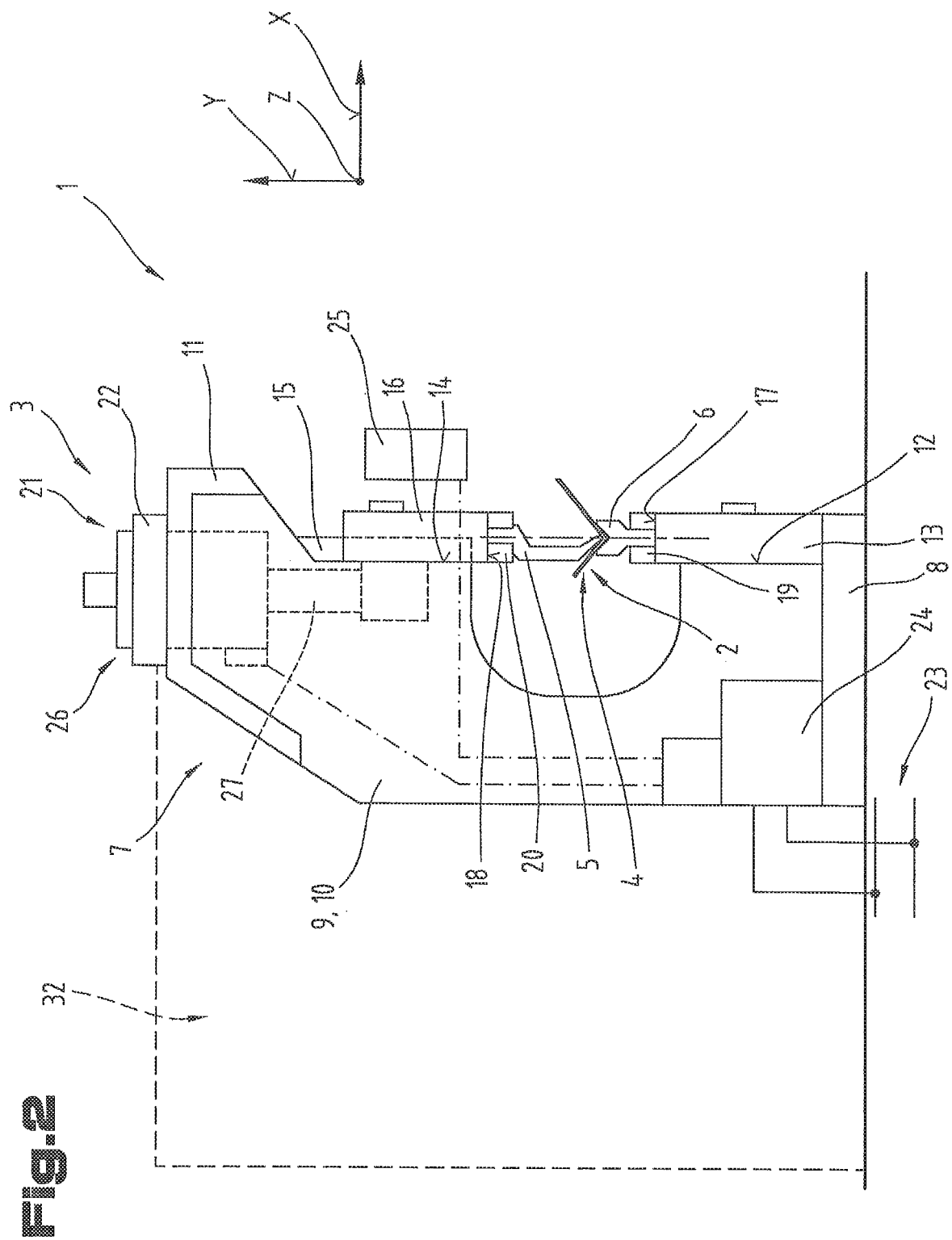
Figure 3:
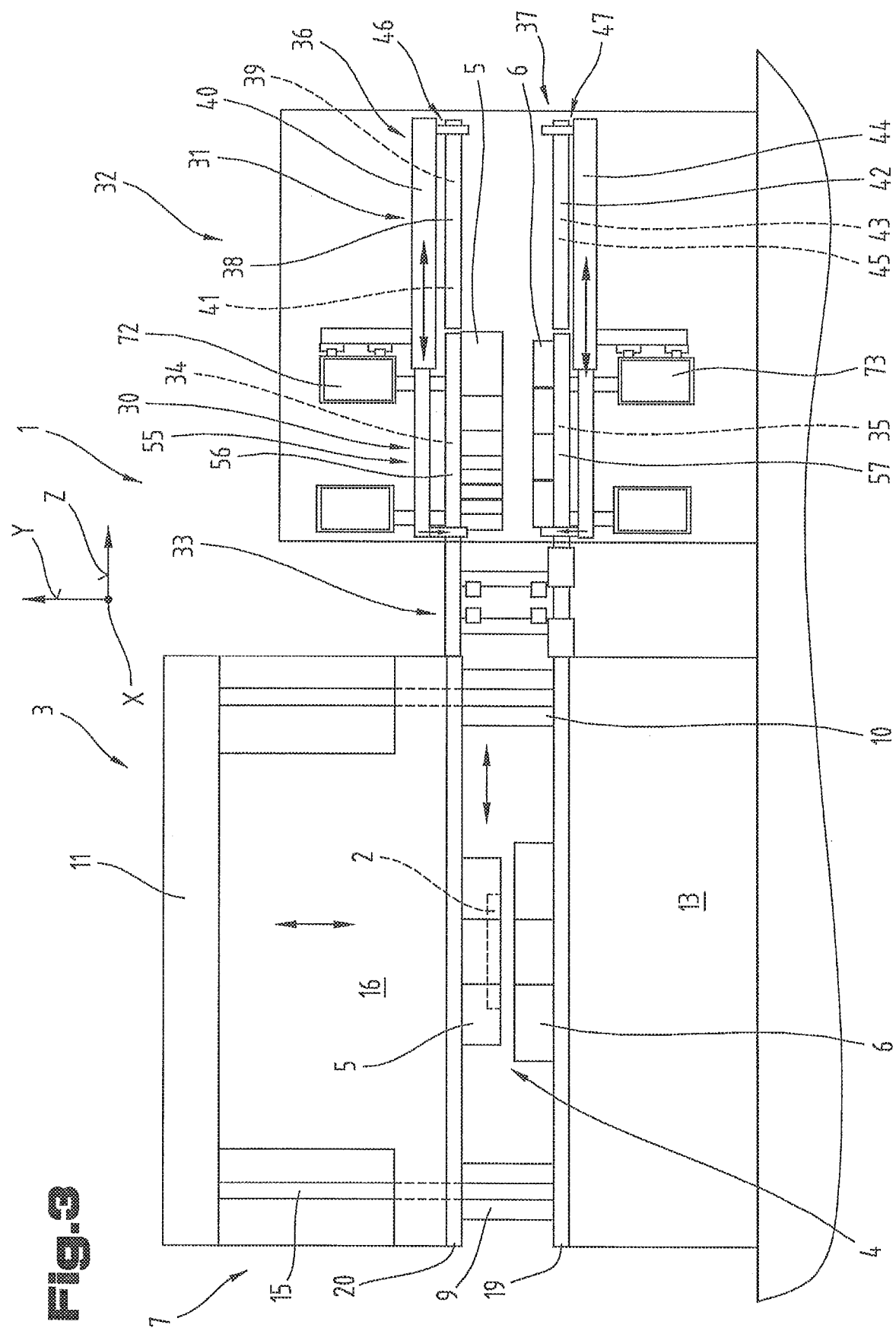
Figure 4:
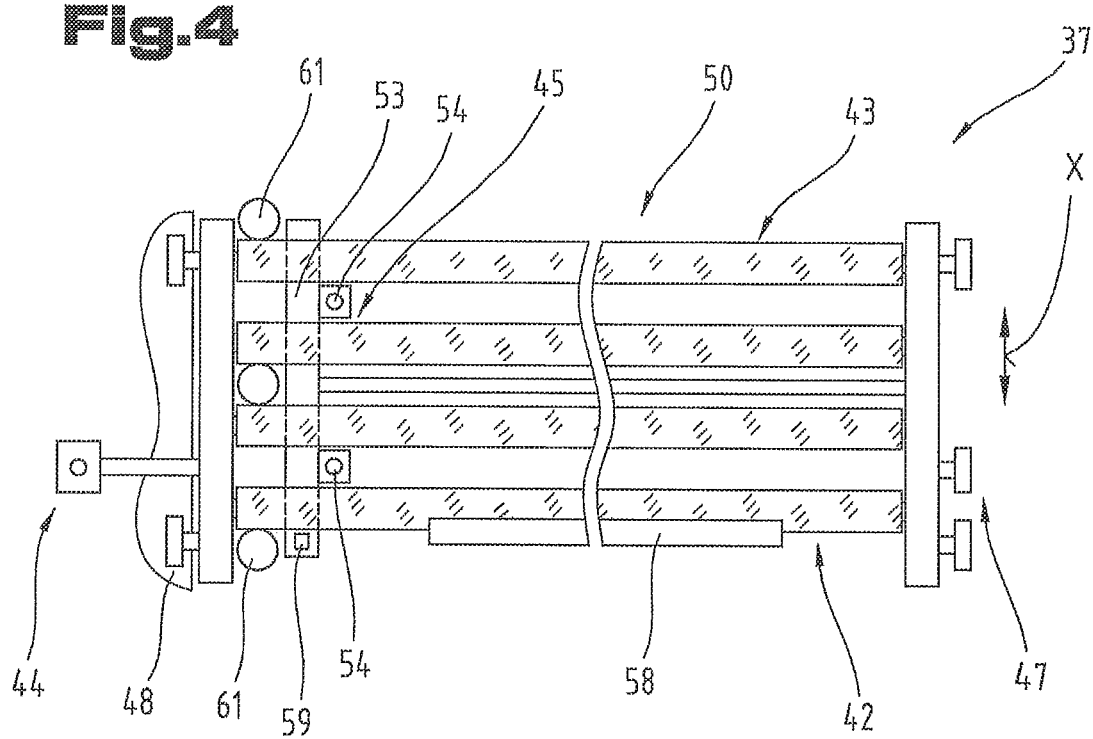
Figure 5:
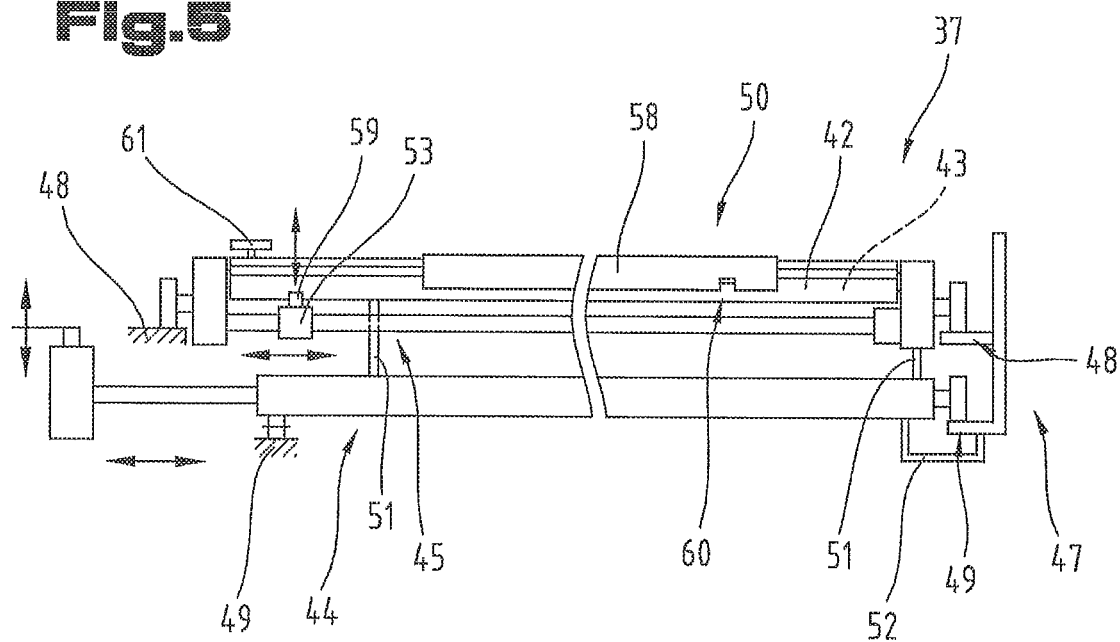
Figure 6:
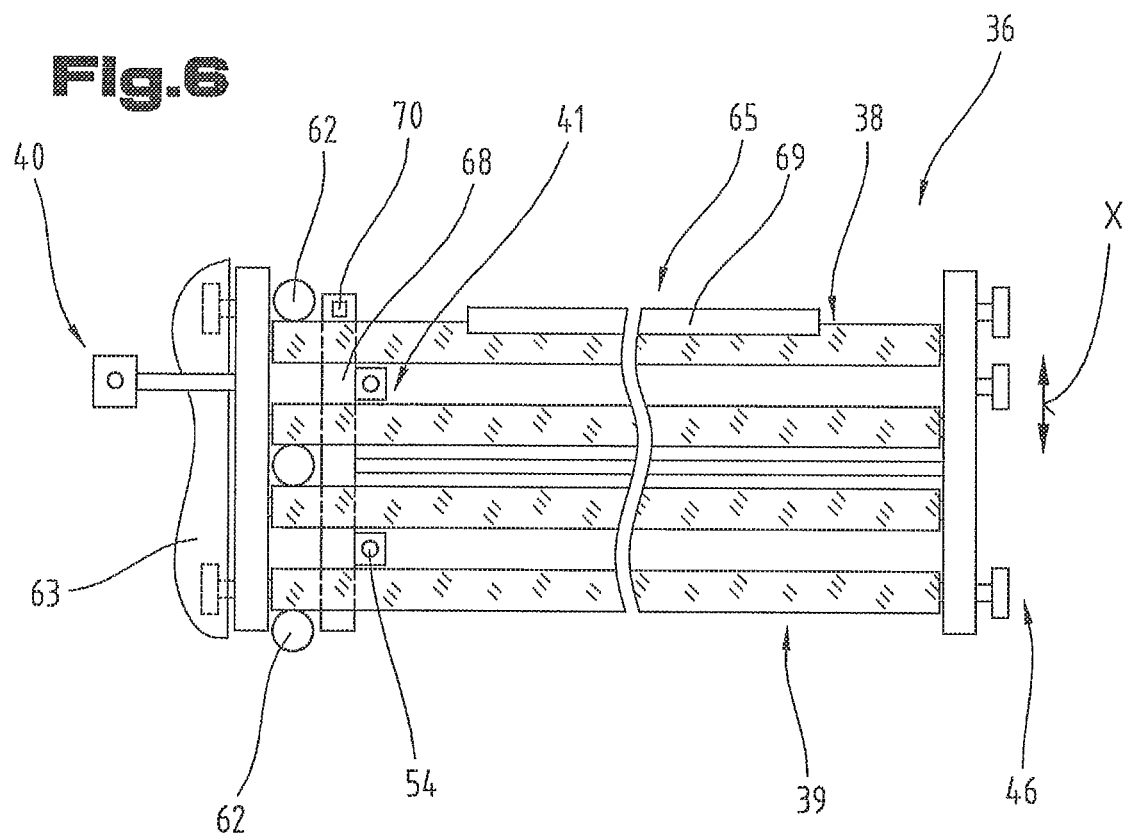
Figure 7:
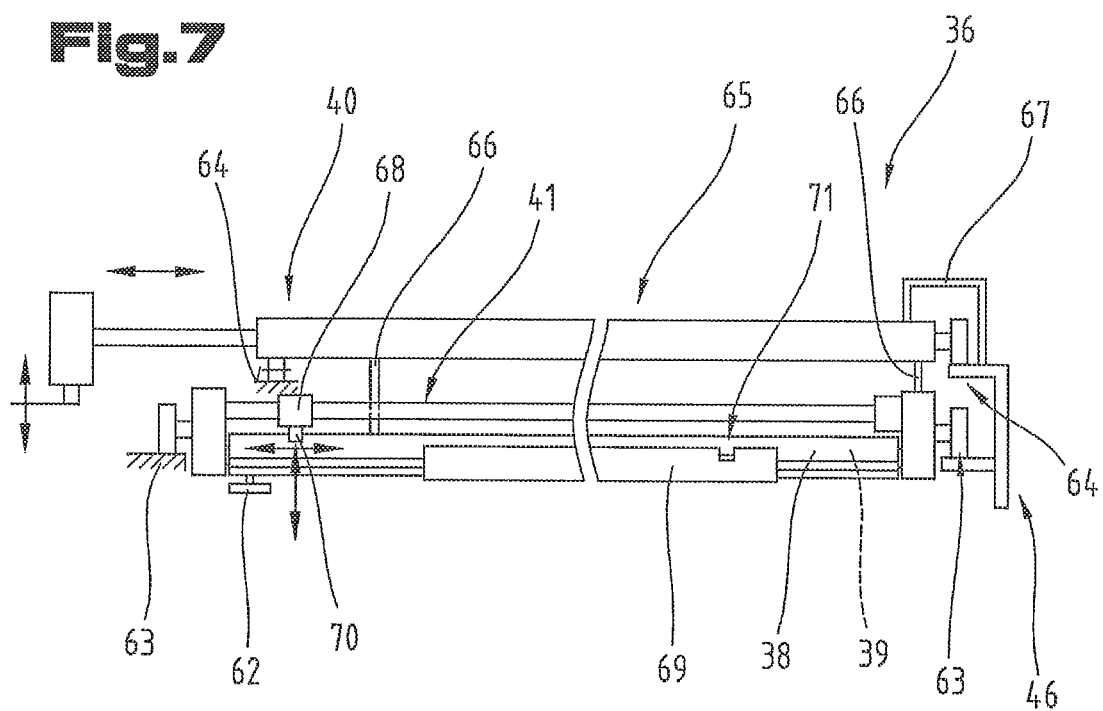

The figures show, each in a greatly simplified, schematic representation:

FIG. 1 a possible embodiment of a bending press with a tool storage system indicated schematically on the side next to it, in a front view;

FIG. 2 the bending press according to FIG. 1 in a side view;

FIG. 3 the tool storage system according to FIG. 1 in a front view;

FIG. 4 the lower tool manipulation device in a top view, in a greatly stylized representation;

FIG. 5 the lower tool manipulation device according to FIG. 4 in a front view;

FIG. 6 the upper tool manipulation device in a view from below, as well as in a greatly stylized representation;

FIG. 7 the upper tool manipulation device according to FIG. 6 in a front view.

As an introduction, it should be stated that in the different embodiments described, the same parts are provided with the same reference symbols or the same component designations, wherein the disclosures contained in the entire description can be transferred analogously to the same parts that have the same reference symbols or the same component designations. Also, the position information selected in the description, such a top, bottom, laterally, etc., refer to the figure being directly described and shown, and in the case of a change in position, this position information should be transferred analogously to the new position.

The term "in particular" is understood, in the following, to mean that this can be a possible, more specific, embodiment or a more detailed specification of an object or of a method step, but does not necessarily represent a compulsory, preferred embodiment of the same or a compulsory method of procedure.

In FIGS. 1 to 7, a production facility 1 is shown in a greatly schematically simplified representation, which facility is configured, in the present case, in particular for free-form bending of workpieces 2 made from a metal sheet, by means of die-bending.

The production facility 1 used for bending in the present case comprises a bending machine, in the present exemplary embodiment a bending press 3, in particular a folding press or die-bending press, for the production of the workpieces 2 or work parts, between the parts of at least one bending tool 4 that can be adjusted relative to one another. In the present exemplary embodiment, the bending tool 4 comprises at least one bending punch 5, but in most cases multiple bending punches 5, and at least one bending die 6, but in most cases multiple bending dies 6 that interact with them. In this regard, the at least one bending punch 5 is disposed on the bending press 3 above the workpiece 2 to be produced, and also held there, accordingly, in particular clamped there. The at least one bending die 6 is also held on the bending press 3, in particular clamped.

In the case of such bending presses 3, the direction that runs in a horizontal plane as well as in a perpendicular orientation with regard to the longitudinal expanse of the bending tool 4, in particular its bending punch 5 as well as bending die 6 is fundamentally referred to as the "X" direction as a coordinate system. Therefore this is the direction which also corresponds to the feed direction of the metal sheet or the removal direction of the metal sheet or of the workpiece 2. The vertical direction, which thereby lies in the height direction of the bending tool 4, is understood to be the "Y" direction. Finally, the direction that runs in the longitudinal direction or in the longitudinal expanse of the bending tool 4, in particular its bending punch 5 as well as bending die 6, is understood to be the "Z" direction. Therefore the bending edge defined by the longitudinal expanse of the bending tool 4 is also oriented to run in the "Z" direction.

A machine frame 7 of the bending press 3 comprises a base plate 8, for example, on which side jaws 9, 10 are disposed, projecting vertically upward and oriented at a distance from one another in the transverse direction and parallel to one another. These jaws are preferably connected with one another at their end regions, which are at a distance from the base plate 8, by means of a solid transverse bracing 11, formed from a shaped sheet-metal part, for example.

The side jaws 9, 10 can be configured approximately in C shape to form a free space for shaping of the workpiece 2 or for charging, wherein a fixed pressing beam 13, in particular one that stands on the base plate 8, is attached at the front face surfaces 12 of shanks of the side jaws 9, 10 that are close to the ground. This pressing beam 13, which is disposed in a fixed location and fixed in place, can also be referred to as a pressing table, on which parts of the bending tool 4 are disposed and also held. A further pressing beam 16, in particular a pressure beam, is mounted at front face surfaces 14 of shanks that are at a distance from the base plate 8, which beam is guided in linear guides 15 so as to be adjustable relative to the pressing beam 13 that forms the table beam. Tool holders 19, 20 for being equipped with the bending tool/tools 4 can be disposed on opposite face surfaces 17, 18 of the two pressing beams 13, 16, which surfaces lie opposite one another and run parallel to one another. The bending tool/tools 4 can also be held on the tool holders 19, 20 with the interposition of an adapter, not shown in any detail, wherein this is viewed as tending not to be advantageous for a replacement process of individual components or of the entire bending tool 4, but does represent another possibility.

The bending press 3 shown has two drive means 22 operated with electrical energy, for example, as a drive arrangement 21 for the adjustable pressing beam 16, namely the pressure beam, which means are connected via lines with a control device 24 fed by an energy network 23. For example, operation of the bending press 3, in particular also the replacement process of the bending tool 4, can be controlled by way of an input terminal 25 that is connected with the control device 24 in terms of communication.

The drive means 22 can be spindle drives 26 having electric motors, for example, as they are generally known, of which setting means 27 for a reversible setting movement of the upper pressing beam 16 formed by the pressure beam are connected with the latter, for example in terms of drive. Independent of this, however, it would also be possible to form the drive means 22 by means of hydraulically and/or pneumatically activated setting means. In this regard, cylinder/piston arrangements can be used. However, other drive means, for example, such as eccentric drives, knee toggle drives, rack and pinion drives, etc., would also be conceivable.

Other details required for operation of such a bending press 3, such as safety devices, feed devices and/or monitoring devices, for example, will not be provided in the present description, in order to avoid an unnecessary length of the description.

Furthermore, the production facility 1 can also comprise a manipulator, not shown in any detail here, which takes at least one piece of a supply stack of metal sheets to be shaped or bent, and brings it into the working region or the operating side of the bending press 3.

The manipulator in turn can comprise a gripper, which in turn has gripping fingers. The gripping fingers each have clamping surfaces on the side that faces the workpiece 2 to be produced. The metal sheet or the workpiece 2 to be produced is held by the manipulator by means of corresponding pivoting of the two gripping fingers against one another and by application of a sufficient clamping force, by means of the interaction of the clamping surfaces, and is correspondingly moved and positioned. Corresponding gripping with the gripping fingers of the gripper, and subsequently, sufficient hold for the workpiece 2 to be produced from the metal sheet, due to the clamping movement, is guaranteed.

Furthermore, it is also shown, in simplified manner, that the bending tool/tools 4, in particular the bending punch 5 and/or the bending die 6, can have at least one separate recess 28, 29, in each instance, for manipulation or handling of the same. Here, manipulation of the bending tool 4 is understood to mean that this tool or its bending punch 5 and/or bending die 6 is/are removed from a tool storage unit 30, which is shown only simplified and partially in FIG. 1, and simplified and schematically in FIG. 3, as needed, preferably in automated manner, and brought to one of the tool holders 19, 20 of the pressing beams 13, 16, and inserted there as well as held in clamped manner. In this regard, it is also possible to speak of a tool replacement system, with which the replacement processes can be carried out using the facility parts required for this purpose. Placement as well as configuration of the tool storage unit 30 can be carried out as a function of the structure of the machine frame 7. Multiple tool storage units 30 could also be provided, wherein here, lateral placement with regard to the longitudinal expanse of the pressing beams 13, 16 or with regard to the side jaws 9, 10 is shown and provided.

To replace or exchange the bending tool 4 or the bending tools 4, these are removed from the tool holders 19, 20 after their clamping hold has been released, and replaced with a different bending tool 4. In this regard, the bending tool 4 to be replaced is generally brought back into the tool storage unit 30 or the tool depot, temporarily stored there, if necessary, and subsequently laid down in accordance with the available storage locations, so that it can later be removed for a further or a different bending process, and inserted into the tool holder/holders 19, 20 once again. The recesses 28, 29 in the bending tool 4 can serve for handling during the replacement process. However, other possibilities would also be conceivable so as to be able to form a mounting between a tool manipulation unit 31, which will still be described in greater detail below, and the bending tool 4 or the bending punch 5 and/or bending die 6 that form the bending tool 4.

Preferably, however, the bending tool 4 is removed from the tool storage unit 30 or brought back into it only by means of a predominant or even exclusive longitudinal displacement, wherein intermediate storage of the bending tool 4 on the tool manipulation unit 31 is advantageous. Subsequent to removal from the tool storage unit 30, hand-over from the tool manipulation unit 31 to the tool holders 19, 20, or also take-over from the tool holders 19, 20 to the tool manipulation unit 31 can take place. In this embodiment of the tool storage unit 30, the bending punches 5 are supplied in their suspended position, and the bending dies 6 are supplied in their standing position, as they are also disposed on the bending press 3 in their later position of use.

In FIGS. 3 to 7, the production facility 1 with the bending press 3 and a tool storage system 32 disposed on the side, in other words next to the machine frame 7, is shown in simplified and stylized form, as well as in different views. The tool storage system 32 can be composed of multiple components or facility parts, and in this embodiment fundamentally comprises the tool storage unit 30 and the tool manipulation unit 31. Part of the tool manipulation unit 31 is shown in FIGS. 4 and 5, in simplified form.

Furthermore, it is also shown here, in simplified form, that the bending tool 4 to be handed over from the tool storage system 32 to the bending press 3 or the bending tools 4 to be handed over from the tool storage system 32 to the bending press 3 or the bending tool/tools 4 to be taken over by the bending press 3 can be manipulated accordingly for their hand-over or take-over, by means of a transfer device 33. In this regard, the transfer device 33 can be configured in such a manner that the bending punch/punches 5 is/are removed from the upper tool holder 20, preferably by means of a longitudinal movement, and handed over to the tool storage system 32. However, the same also holds true for the bending die/dies 6. However, charging of bending punches 5 and/or bending dies 6, proceeding from the tool storage system 32 to the bending press 3, can also take place by means of the transfer device 33.

The entire production facility 1 with its individual facility parts is generally set up on a hall floor, not indicated in any detail, as a preferably level contact surface, as indicated in FIG. 3.

In the present exemplary embodiment, the tool storage unit 30 serves to be able to hold a plurality of bending punches 5 as well as bending dies 6 in it, sorted accordingly, and to keep them on hand. Depending on the number of bending tools 4 to be held, in particular their bending punches 5 and bending punches 6, at least one upper storage rail 34 and at least one lower storage rail 35 are provided. Preferably, however, multiple upper storage rails 34 as well as multiple lower storage rails 35 are provided to form the tool storage unit 30. Furthermore, the at least one upper storage rail 34 and the at least one lower storage rail 35 are disposed spaced apart by a predetermined and preferably fixed vertical distance from one another. In contrast to adjustably or displaceably disposed storage rails, both the upper storage rails 34 and the lower storage rails 35 are disposed locally fixed relative to one another, and are held on a base frame, which is not indicated in any detail. If multiple upper storage rails 34 are provided, these can define an upper storage plane. The same also holds true, however, for the lower storage rails 35, which in turn can define a lower storage plane.

By means of dividing the tool storage unit 30 up into preferably multiple upper storage rails 34 and multiple lower storage rails 35, these can be disposed, in each instance, both parallel to one another and one behind the other in the "X" direction, in the respective storage plane.

Furthermore, it is also shown here, in the region of the tool storage system 32, that the tool manipulation unit 31 is provided or disposed on the side next to the tool storage unit 30, in other words next to it in the "Z" direction. In order to be able to manipulate the bending punch/punches 5 as well as the bending dies 6 in accordance with the process of placement into storage or removal from storage to be carried out, from each of the storage planes defined by the storage rails 34 or 35, the tool manipulation device 31 comprises at least one upper tool manipulation device 36 and at least one lower tool manipulation device 37. Each of the tool manipulation devices 36 and 37 is disposed, in each instance, in the region of a face side of the at least one upper storage rail 34 or of the at least one lower storage rail 35. Due to the longitudinal expanse of the storage rails 34 and 35, in this exemplary embodiment the region of the face side is understood to be that side of the storage rails 34, 35 that lies on the side facing away from the bending press 3.

As can now be seen better when looking at FIG. 3 together with either FIGS. 4 and 5 or with FIGS. 6 and 7, each of the tool manipulation devices 36, 37 in turn comprises multiple components or component parts. Furthermore, each of the tool manipulation devices 36 and/or 37 can be guided to be displaced laterally next to the at least one tool storage unit 30, in the "X" direction, so as to be able to get to or be displaced to the respective upper storage rail 34 or to the respective lower storage rail 35 for the handling process to be carried out, in the case that multiple storage rails 34 and/or 35 are provided.

In the following, due to the separate and independent arrangement of the tool manipulation unit 31 with its at least one upper tool manipulation device 36 and its at least one lower tool manipulation device 37, the configuration of only one of the same will be explained, in each instance. A corresponding mirror-image arrangement or configuration of the other tool manipulation device 37 or 36 is to be provided accordingly.

In the present exemplary embodiment, the upper tool manipulation device 36 comprises at least one upper working rail 38 as well as at least one upper auxiliary rail 39 disposed laterally relative to the former, running parallel with regard to the upper working rail 38. The at least two rails 38, 39 are preferably disposed in the same upper storage plane as the upper storage rails 34. Furthermore, at least one upper drawing-in device 40 is also provided, with which it is possible to be able to displace at least one bending punch 5 to be held, from the tool storage unit 30 to the upper tool manipulation device 36, in the case of a corresponding orientation of the upper working rail 38 or of the upper auxiliary rail 39 with regard to the at least one upper storage rail 34. For this purpose, either the upper working rail 38 or the upper auxiliary rail 39 must be oriented to align with regard to the at least one upper storage rail 34, so as to be able to carry out a simple hand-over process, preferably in a straight-line movement.

Furthermore, in this exemplary embodiment the upper tool manipulation device 36 also comprises at least one upper pushing-out device 41. The at least one upper pushing-out device 41 serves for being able to hand over, in particular push out at least one bending punch 5, either from the upper working rail 38 or from the upper auxiliary rail 39, either back into the tool storage unit 30, in particular the at least one upper storage rail 34, or, in contrast, to the transfer device 33.

As was already described above, the lower tool manipulation device 37 is fundamentally structured in the same manner as the upper tool manipulation device 36. This can be seen when looking at FIG. 3 together with FIGS. 4 and 5.

Thus, the lower tool manipulation device 37 comprises at least one lower working rail 42 and at least one lower auxiliary rail 43 that is disposed laterally next to the former, likewise running parallel with regard to the lower working rail 42. Furthermore, the lower manipulation device 37 also comprises at least one lower drawing-in device 44 for at least one bending die 6 to be held on the working rail 42 or on the auxiliary rail 43. Likewise, here, too, at least one lower pushing-out device 45 is provided, which serves for being able to discharge, in particular to push out at least one bending die 6 from the lower tool manipulation device 37, from the lower working rail 42 or the lower auxiliary rail 43.

Each of the drawing-in devices 40, 44 can be disposed on its own base frame or form this frame, wherein a separate drawing-in arm can be moved out per drawing-in apparatus 40, 44, in the parallel direction with regard to the working rails 38, 42. A separate activation arm is provided on each of the extendable ends of the drawing-in arms, which activation arms are generally configured to be adjustable in the vertical direction, so that they can be brought into engagement either with a bending punch 5 disposed on the upper storage rail 34 or with a bending die 6 disposed on the lower storage rail 35, for the adjustment movement to be performed. For the respective extension movement, each of the activation arms is situated in a set-back position, in order to prevent collisions with the bending punch 5 or the bending die 6. If the respective activation arm is situated on the side of the bending punch 5 or the bending die 6 that faces away from the tool manipulation device 36, 37, the respective activation arm can be changed to its engagement position.

As can now be seen better, once again, from FIGS. 3, 6, and 7, the at least one upper tool manipulation device 36 can be displaced parallel with regard to the upper storage plane as well as in the perpendicular direction with regard to the longitudinal expanse of the at least one upper storage rail 34, along an upper longitudinal guide arrangement 46. For the sake of better clarity, drive means for carrying out the displacement movements were left out of the representation.

The same also holds true, however, for the at least one lower tool manipulation device 37, which can also be displaced parallel with regard to the lower storage plane as well as in the perpendicular direction with regard to the longitudinal expanse of the at least one lower storage rail 35, along a lower longitudinal guide arrangement 47. This can be seen when looking at FIGS. 3, 4, and 5 together.

In this way, rapid and, above all, separate and independent provisioning and/or placement into storage of bending punches 5 and bending dies 6 can take place by means of the separate configuration of the upper storage rail/rails 34 with the at least one upper tool manipulation device 36, as well as the lower storage rail/rails 35 with the at least one lower tool manipulation device 37.

As has already been described above, a multiple arrangement of upper storage rails 34 and multiple lower storage rails 35 is provided to enlarge or increase the respective storage space. The individual upper storage rails 34 and the individual lower storage rails 35 are oriented to run parallel to one another in each of their storage planes, wherein the two storage planes defined by the respective storage rails 34 or 35 can have a horizontal orientation relative to one another, in each instance.

In FIGS. 4 and 5, the lower tool manipulation device 37 is shown in simplified form, wherein analogous to this, the embodiment to be described in the following can also be transferred to the upper tool manipulation device 36. This will still be briefly explained below in the two FIGS. 6 and 7.

In the present exemplary embodiment, it can be seen from FIG. 4 that the front lower rail shown forms the lower working rail 42, and the rail shown above or behind it forms the lower auxiliary rail 43. Each of the rails 42, 43 has a holding slot, not indicated in any detail, so as to be able to hold a part of the bending die 6 in it for guidance and support. The lower longitudinal guide arrangement 47 is provided so as to be able to carry out the displacement movement of the lower tool manipulation device 37 in the "X" direction, as described above. In the present exemplary embodiment, the lower longitudinal guide arrangement 47 is formed in the region of one of the face sides of the lower working rail 42 and of the lower auxiliary rail 43, in each instance, by means of at least one first lower guide track 48 and at least one second lower guide track 49. In this regard, it should be mentioned that each of the lower guide tracks 48, 49 can also have multiple individual guide tracks.

Preferably, the individual guide tracks of the lower guide tracks 48, 49 are disposed spaced apart from one another in the "Z" direction, in order to thereby be able to form a more stable and, above all, tilt-proof guide for the lower tool manipulation device 37. Suspension or mounting of the individual guide tracks of the lower guide tracks 48, 49 can take place, for example in the "Z" direction, by means of a portal construction or a portal design, Independent of this, suspension or mounting of the individual guide tracks of the lower guide tracks 48, 49 in the "Y" direction can be carried out in the form of a cantilever construction, cantilever design or balcony construction.

In this regard, a vertical offset between the respective lower individual guide tracks can also be present or configured in the case of each of the lower guide tracks 48, 49.

The at least one lower working rail 42 and the at least one lower auxiliary rail 43 of the lower tool manipulation device 37 form a cohesive lower construction unit 50, among other things with connection parts as well as further components that are not indicated in any detail. The lower construction unit 50 in turn can be displaced in the "X" direction, on the at least one first lower guide track 48 of the lower longitudinal guide arrangement 47, by means of a drive device that is not indicated in any detail. In this way, as needed, a corresponding predetermined relative position with regard to one of the lower storage rails 35 can be approached for take-over or hand-over of bending dies 6.

Furthermore, here it is also shown, in simplified form, that the lower drawing-in device 44 of the lower tool manipulation device 37 can also be displaced on the at least one second lower guide track 49 of the lower longitudinal guide arrangement 47, even on its own and independent of the lower construction unit 50. Preferably, however, a joint displacement movement with the lower construction unit 50 takes place, wherein in this way, additional support of the lower tool manipulation device 37 can be achieved. Each of the two lower guide tracks 48, 49 is preferably disposed or configured in the region of faces ends of the lower construction unit 50 that lie opposite one another. Preferably, the first lower guide track 48 is disposed or configured above the second lower guide track 49, seen in the vertical direction.

In order to be able to carry out a joint displacement movement between the lower construction unit 50 and the lower drawing-in device 44, at least one lower coupling device 51 can be provided between the lower construction unit 50 and the lower drawing-in device 44. As needed, the lower coupling device 51 can be unlocked or released, thereby making it possible to be able to displace the lower construction unit 50 independent of the lower drawing-in device 44, along its lower guide tracks 48, 49.

It is also possible that the lower drawing-in device 44 has or is provided with at least one lower locking means 52 or a locking device, with which means or device it becomes possible to be able to hold the lower drawing-in device 44 locally fixed in position when the lower locking means 52 is situated in a locking position relative and with regard to the at least one second lower guide track 49 of the lower longitudinal guide 47. Preferably, locking takes place on the second lower guide track 49. By means of this relative positioning of the lower drawing-in device 44 relative and with regard to the second lower guide track 49, and the previously unlocked lower coupling device 51, it becomes possible to be able to dispose and hold the one lower drawing-in device 44 for drawing-in or taking at least one bending die 6 from a lower storage rail 35, relative to this rail. Depending on the relative position of the lower construction unit 50, the bending die 6 to be taken up or drawn in can now be drawn in and held either on the lower working rail 42 or on the lower auxiliary rail 43. This depends on the respective relative position of the lower working rail 42 and of the lower auxiliary rail 43 relative to the respective lower storage rail 35. As a result, it is possible to make do with one lower drawing-in device 44, and nevertheless, corresponding displacement of the bending die 6 either to the lower working rail 42 or the lower auxiliary rail 43 can be carried out.

The pushing-out device 45 already briefly described above serves to be able to push out the at least one bending die 6 held on the lower working rail 42 or on the lower auxiliary rail 43 either back onto one of the lower storage rails 35 or toward the bending press 3 for hand-over. Preferably, the at least one lower pushing-out device 45 is disposed on or attached to the lower construction unit 50 described above. As a result, the lower pushing-out device 45 can comprise at least one lower slide piece 53 that can be displaced in the direction of the longitudinal expanse of the lower working rail 42 or of the lower auxiliary rail 43. The lower slide piece 53 is guided on guides, not shown in any detail, so as to be displaceable in the direction of the longitudinal expanse of the lower working rail 42 and of the lower auxiliary rail 43. Thus, it is furthermore shown here that the lower slide piece 53 is disposed below the top of the lower working rail 42 and of the lower auxiliary rail 43. In this way, collisions with the bending dies 6 disposed on the working rail/rails 42 and/or the auxiliary rail 43 can be prevented. Preferably, the slide piece 53 extends in the transverse direction with regard to the longitudinal expanse of the working rail 42 and the lower auxiliary rail 43.

It is also shown, in simplified form, that at least one, but preferably multiple setting fingers 54 are disposed or provided on the lower slide piece 53, which fingers can be adjusted from a working position, in which they are in engagement with the at least one bending die 6, into a rest position, in which they are out of engagement with the at least one bending die, by means of setting means that are not indicated in any detail. Preferably, at least one separate setting finger 54 is assigned both to the lower working rail 42 and to the lower auxiliary rail 43, in each instance. Depending on the activation or relative position of the setting finger 54, as well as the position of the lower working rail 42 or lower auxiliary rail 43 relative to one of the lower storage rails 35, the respective bending die/dies 6 can be discharged, in particular pushed out from the lower construction unit 50.

As can now be better seen again, again from FIG. 3, a provisioning unit 55 is provided in the front region of the tool storage unit 30, in the immediate connection region or hand-over region 33 and of the tool manipulation unit 31 with its upper tool manipulation device 36 and its lower tool manipulation device 37. The provisioning unit 55, shown in simplified form here, comprises at least one upper provisioning rail 56 and at least one lower provisioning rail 57. In this way, it becomes possible to carry out a tool replacement or tool exchange between the bending press 3 and the tool storage unit 30 even more simply. Thus, when removing bending punches 5 and/or bending dies 6, proceeding from the tool holders 19, 20, they can be conducted further or handed over to the upper provisioning rail 56 or the lower provisioning rail 57 by the transfer device 33, independent of one another, in each instance. The bending punches 5 disposed on the upper provisioning rail 56 can be brought either onto the upper working rail 38 or the upper auxiliary rail 39, if the upper tool manipulation device 36 is oriented accordingly, by means of the upper drawing-in device 40 of the latter. However, the same also holds true for the bending dies 6 that are disposed below. These are adjusted or moved either to the lower working rail 42 or the lower auxiliary rail 43 from the lower provisioning rail 57, analogously, by the lower drawing-in device 44. All of these movements take place preferably in a straight line, so as to have to carry out simple adjustment processes for the exchange or replacement of bending tools 4. The provisioning unit 55 can form a transfer unit together with the transfer device 33.

If only a few or actually only one bending die 6 is/are situated on the lower provisioning rail 57, this die must be brought to the transfer device 33, proceeding from its position adjacent to the lower tool manipulation device 37, along the lower provisioning rail 57. For this purpose, a lower pusher 58 can be provided on the lower construction unit 50, which pusher is mounted on the lower construction unit 50 in the parallel direction with regard to the at least one lower working rail 42, preferably guided on the latter. By means of the lower pusher 58, it becomes possible to displace the bending die/dies 6 from the right-side end, here, of the lower provisioning rail 57, to the left-side end of the lower provisioning rail 57, in other words toward the transfer device 33, if the pusher is adjusted accordingly. For this purpose, the lower pusher 58 can be adjusted from its extended position, in which it projects beyond the lower construction unit 50 in the direction toward the tool storage unit 30, into a rest position, in which it is situated within the lower construction unit 50.

The lower slide piece 53, which can be adjusted in the direction of the longitudinal expanse of the lower working rail 42 and of the lower auxiliary rail 43, can have a first lower coupling element 59 in addition to the setting finger/ fingers 54. The first lower coupling element 59 can be adjusted, preferably in the vertical direction, by means of a setting drive, not indicated in any detail, so that it can be brought into a coupling position in engagement with a second lower coupling element 60 disposed or configured on the lower pusher 58, as needed.

In this way, not only can the lower pushing-out device 45 with the setting finger/fingers 54 be displaced by means of the longitudinal adjustment of the lower slide piece 53 in the direction of the longitudinal expanse of the lower working rail 42 or of the lower auxiliary rail 43, but also active engagement with the lower pusher 58 can be produced in the case of corresponding displacement of the first lower coupling element 59, and thereby this pusher can also be adjusted in the longitudinal expanse or longitudinal direction of the lower working rail 42. For example, the longitudinal adjustment of the lower slide piece 53 can take place using a setting element not shown in any detail, for example a spindle and a drive motor connected with it. However, other drive means would also be possible. As a result, in combination with the longitudinal guidance of the lower slide piece 53 and its setting element, the relative position, as necessary, with regard to the lower working rail 42 and of the lower auxiliary rail 43 can be adjusted, as necessary.

From FIGS. 4 and 5, it can also be seen that at least one lower setting means 61, in particular a drive wheel, can be disposed on the at least one lower working rail 42 and on the at least one lower auxiliary rail 43. In the present exemplary embodiment, multiple lower setting means 61 are provided, which serve to bring components of the bending tool 4, in this case the respective bending die 6, so far either onto the lower working rail 42 and/or the lower auxiliary rail 43 that when a displacement movement of the lower tool manipulation device 37 is carried out, no lateral projection beyond the rails 42, 43 takes place. In this way, unintentional collisions with the lower storage rails 35 of the tool storage unit 30 can be prevented. For this purpose, the at least one lower setting means 61 is disposed in an end region of the at least one lower working rail 42 and/or the at least one lower auxiliary rail 43, which region faces the tool storage unit 30. The dimensioning and placement of the lower setting means 61 (singular or plural) preferably takes place laterally next to the bending die 6 to be displaced, so as to be able to carry out the adjustment movement at the lower working rail 42 and/or the lower auxiliary rail 43 in the manner of a friction contact.

In an alternative further embodiment, it would be possible to configure the at least one setting means 61 not, as described above, as a drive wheel, but rather as an intermediate wheel, idler wheel or guide wheel, and to dispose it at the end or in the end region of the lower tool manipulation device 37 that faces the tool storage unit 30. In this way, it becomes possible that the at least one intermediate wheel, idler wheel or guide wheel comes into contact with bending tools 4, in the present case with bending dies 6, situated at the edge in the tool storage unit 30, during the displacement movement of the lower tool manipulation device 37 in the "X" direction, and displaces these into the tool storage unit 30 in the "Z" direction. By means of this relative adjustment movement of the bending tool/tools 4 in the "Z" direction, in this way a gap can be formed or created between the bending tools 4 situated at the edge in the tool storage unit 30 and the bending tool/tools 4 situated on the lower tool manipulation device 37.

The configuration described above relates to the lower tool manipulation device 37 according to FIGS. 4 and 5, wherein the following description relates to the configuration or embodiment of the upper tool manipulation device 36 according to FIGS. 3 and 6 as well as 7. For this reason, in the following only a brief listing of the components or component groups will be given, wherein the detailed description of the lower tool manipulation device 37 should be transferred accordingly and analogously to the upper tool manipulation device 36.

Here, analogous to the lower longitudinal guide arrangement 47, the upper longitudinal guide arrangement 46 comprises at least one first upper guide track 63 and at least one second upper guide track 64. In order to be able to also carry out a corresponding displacement movement of the upper tool manipulation device 36 in the "X" direction, laterally next to the tool storage unit 30, at least the first upper guide track 63 and at least the second upper guide track 64 are provided, in each instance, in the region of the face sides of the upper working rail 38 and of the upper auxiliary rail 39, which lie opposite one another.

In this regard, it should be mentioned that each of the upper guide tracks 63, 64 can also have multiple upper individual guide tracks. Preferably, these are disposed spaced apart from one another in the "Z" direction, so as to be able to form a stable and, above all, tilt-free guide for the upper tool manipulation device 36 in this manner. In this regard, a vertical offset between the respective upper individual guide tracks can also be present or configured in the case of each of the upper guide tracks 63, 64.

Furthermore, here, too, the at least one upper working rail 38 and the at least one upper auxiliary rail 39, once again among other things, can form an upper construction unit 65 of the upper tool manipulation device 36. Thus, the upper construction unit 65 and with it both the upper working rail 38 and the upper auxiliary rail 39 can be jointly displaced on the at least one first upper guide track 63 of the upper longitudinal guide arrangement 46, by means of a drive not shown in any detail, in the "X" direction, laterally next to the upper storage rails 34. As a result, take-over or hand-over of bending punches 5 between the at least one upper storage rail 34 and the upper construction unit 65, in particular its upper working rail 38 and/or upper auxiliary rail 39, can be carried out in simple manner.

The upper drawing-in device 40 of the upper tool manipulation device 36 can in turn be disposed so as to be displaceable on the at least one second upper guide track 64. In this way, once again, an independent adjustment movement or displacement movement relative and with regard to the upper construction unit 65 can take place. In order to be able to carry out a joint displacement movement of the upper construction unit 65 with the upper drawing-in device 40, along the upper longitudinal guide arrangement 46, at least one upper coupling device 66 can be provided between the upper construction unit 65 and the upper drawing-in device 40. The upper coupling device 66 can also either couple the upper construction unit 65 and the upper drawing-in device 40 with one another, as described above for the lower coupling device 51, or, in the uncoupled position, allow an adjustment movement of the two components independent of one another.

Likewise, here, too, the upper drawing-in device 40 can have at least one upper locking means 67, with which the upper drawing-in device 40 is held locally fixed in position relative and with regard to the at least one second upper guide track 64 when the upper locking means 67 is/are in the locking position. The locking position assumed by the at least one upper locking means 67 is preferably configured between the drawing-in device 40 and the second upper guide track 64. In this way, when the upper coupling device 66 is uncoupled, the upper drawing-in device 40 can be locked on the second upper guide track 64, relative and with regard to it, and thereby held in position. Thus, when the upper drawing-in device 40 is situated in the locking position, and when the upper coupling device 66 is uncoupled, either the upper working rail 38 or the upper auxiliary rail 39 can be adjusted to an aligned orientation with one of the upper storage rails 34. In this way, take-over or hand-over of bending punches 5 between the upper construction unit 65 and the respective upper storage rail 34 can optionally be preselected, in simple manner, without a further additional drawing-in device 40, 44 being required.

Each of the drawing-in devices 40, 44 serves to displace the respective components of the bending tool 4 from one of the storage rails 34, 35 or one of the provisioning rails 56, 57 to one of the construction units 50, 65.

The upper pushing-out device 41 is disposed on the upper construction unit 65 here, and can in turn have an upper slide piece 68 that can be displaced or guided on the at least one upper working rail 38 and the at least one upper auxiliary rail 39, in the direction of the longitudinal expanse of these rails. In turn, at least one setting finger 54 can be disposed on this upper slide piece 68, which finger can be displaced or adjusted into a working position for the pushing-out movement, in which it is in engagement with the at least one bending punch 5. This can take place by means of a cylinder/piston arrangement or another setting drive. However, a pivoting movement would also be conceivable. If the at least one setting finger is situated in its rest position, the bending punch/punches 5 can be displaced to or drawn into either the upper working rail 38 or the at least one upper auxiliary rail 39 by means of the upper drawing-in device 40, for example.

Here again, it would be possible to provide an upper pusher 69 on the upper construction unit 65, which pusher is disposed in the parallel direction with regard to the at least one upper working rail 38, preferably mounted on it so as to be guided on it. The upper pusher 69 can also, once again, be configured to be adjustable from an extended position in which it projects beyond the upper construction unit 65 in the direction toward the tool storage unit 30, to a rest position in which it is situated within the outer boundary of the upper construction unit 65. To carry out this relative adjustment movement, once again a first upper coupling element 70 can be disposed or configured on the upper slide piece 68. A second upper coupling element 71 can be disposed or provided on the upper pusher 69, wherein a drive connection between the upper slide piece 68 and the upper pusher 69 can be produced when the coupling elements 70, 71 are in the coupling position, in the case of a corresponding adjustment of the first upper coupling element 70. In the case of an adjustment movement of the upper slide piece 68 and the coupling elements 70, 71 being in engagement, the upper pusher 69 can be relatively displaced relative and with regard to the upper construction unit 65, preferably in the direction of the longitudinal expanse of the upper working rail 38 or the upper auxiliary rail 39. In this way, in the case of a low number of bending punches 5 on the upper provisioning rail 56, these punches can be displaced, in particular pushed closer to the transfer device 33.

Here again, an upper setting means 62 can be provided in order to prevent a possible collision during an adjustment movement of the upper tool manipulation device 36 in the perpendicular direction with regard to the longitudinal expanse of the upper storage rails 34, which means can also be configured as a drive wheel, in particular. In place of the drive wheel, however, a belt drive that lies against the bending punch 5 or the bending die 6 can also be used. The at least one upper setting means 62 can be disposed on the at least one upper working rail 38 and/or the at least one upper auxiliary rail 39, in an end region that faces the tool storage unit 30.

In the case of a further alternative embodiment, it would be possible to configure the at least one upper setting means 62 not, as described above, as a drive wheel, but rather as an intermediate wheel, idler wheel or guide wheel, and to dispose it at the end or in the end region of the upper tool manipulation device 36, which end or end region faces the tool storage unit 30. In this way, it becomes possible that the at least one intermediate wheel, idler wheel or guide wheel comes into contact with bending tools 4 situated at the edge in the tool storage unit 30, during the displacement movement of the upper tool manipulation device 36 in the "X" direction, in the present case with bending punches 5, and displaces these into the tool storage unit 30 in the "Z" direction. In this way, by means of this relative adjustment movement of the bending tool/tools 4, a gap can be formed or created in the "Z" direction between those bending tools 4 situated on the edge side in the tool storage unit 30 and the bending tool/tools 4 situated on the upper tool manipulation device 36.

If a bending punch 5 or a bending die 6 is present in the end region of one of the tool manipulation devices 36, 37, which region faces the tool storage unit 30, corresponding displacement in the direction toward the opposite end or the opposite end region of the respective construction unit 50, 65 can be carried out.

Furthermore, as indicated in simplified form in FIG. 3, at least one upper turning device 72 can be disposed or provided in the hand-over region between the upper storage rail/rails 34 and the upper tool manipulation device 36. The at least one upper turning device 72 serves to be able to change the orientation of bending punches 5 by 180°. However, at least one lower turning device 73 can also be disposed or provided in the hand-over region between the lower storage rail/rails 35 and the lower tool manipulation device 37. In this way, turning of bending dies 6 by 180° can be carried out. This turning process relates to pivoting about a pivot axis oriented in the perpendicular direction with regard to the storage planes.

By means of the division of the respective construction unit 50 and 65 into at least one working rail 38, 42 and at least one auxiliary rail 39, 43, as described above, in this way relocation processes for assembling the respective tool set for forming a bending tool 4 from preferably multiple bending punches 5 and multiple bending dies 6 can be simplified. In this way, only those parts of the bending tool that are subsequently actually required in the region of the bending press 3 can be pushed onto the respective working rail 38, 42. If further components of the bending tool 4 are still ahead of the required bending punch 5 or bending die 6, seen in the drawing-in direction, the bending punch/punches 5 or bending die/dies 6 that are not required can be temporarily stored on the respective auxiliary rail 39, 43. If the required bending punch 5 or the required bending die 6 is situated in the immediate hand-over region toward the construction unit 50 or 65, the respective working rail 38, 42 can be adjusted to flush alignment relative to the respective storage rail 34, 35. Only then can or should the respective bending punch 5 or the bending die 6 be displaced onto one of the working rails 38, 42 by means of the drawing-in device 40, 44. Subsequently, the bending punches 5 or bending dies 6 temporarily stored on the respective auxiliary rail 39, 43 can be displaced back to a free storage location of one of the storage rails 34, 35.

Some of the storage rails 34, 35 can also be used to temporarily store a prepared tool set of the bending tool 4, compiled in the correct sequence, on at least one of these rails. Then the already compiled set of bending punches 5 or bending dies 6 can be taken over onto the respective tool manipulation device 36 or 37, using a simple take-over process, and from there be brought directly to the respective provisioning rail 56, 57 and handed over to the respective provisioning rail 56, 57. Fundamentally, any of the storage rails 34, 35 can be used for this provisioning of bending punches 5 and bending dies 6 that are already provided or required for the next bending process. Preferably, however, the storage rail 34, 35 that is preferably disposed directly adjacent to one of the provisioning rails 56, 57 is used. However, multiple of the storage rails 34 and/or 35 can also be used for this purpose, so as to be able to hold at least one bending tool 4 that has already been compiled, composed of one or more bending punches 5 and one or more bending dies 6.

However, these storage rails 34 and/or 35, serving as an intermediate storage rail, can also be used to be able to temporarily hold a bending tool 4 that is no longer required for the bending press 3, before it is placed in the tool storage unit 30. The corresponding sorted placement of the individual bending punches 5 and/or bending dies 6 back into the tool storage unit 30 can then be carried out subsequently.

Furthermore, however, it would also be possible that the tool storage system 32 comprises two tool storage units 30 disposed next to one another, and that a tool manipulation unit 31 is disposed or provided between the two tool storage units 30. In this way, corresponding charging or supply of the bending press 3 with the corresponding bending tools 4 can take place from the two tool storage units 30.

A further possible embodiment of the production facility 1 can consist in that two bending presses 3, for example, can be supplied with the corresponding bending tools 4, using a tool storage system 32 comprising a tool storage unit 30 and a tool manipulation device 31. In this regard, the two bending presses 3 could be disposed spaced apart from one another, viewed in the longitudinal expanse of their pressing beams 13, 16, for example, and the tool storage system 32 could be disposed between them.

However, in the case of multiple placement of bending presses 3, it would also be possible to provided two tool storage units 30, for example, between them, with a tool manipulation unit 31 jointly assigned to them. In this case, the two bending presses 3 and the tool storage units 30 with their provisioning rails 56, 57 could be disposed in a set-up line, viewed in the longitudinal expanse of the pressing beams 13, 16.

A further placement possibility of the production facility 1 would also consist of also providing two bending presses 3, for example, which are disposed "back to back" relative to one another. In this way, the charging and manipulation sides are disposed to lie opposite one another, in each instance. On the side next to these bending presses 3, once again one or more, in particular two tool storage units 30 could be disposed one behind the other in the "X" direction, wherein a tool manipulation unit 31 is disposed or provided on the side of the tool storage units 30 that faces away from the bending presses 3.

However, in addition to the embodiment described above, it would also be possible to provide two further bending presses 3, again "back to back," and thereby a total of four bending presses 3 could be supplied by the tool storage system 32. In this regard, once again it would be possible to make do with a single tool manipulation device 31, wherein then, charging of the bending presses 3 takes place at the front side of the bending presses 3, which face away from one another, viewed in the "X" direction here, in each instance. Since in this case a greater number of bending tools 4 must be kept on hand, multiple placement of tool storage units 30 or a larger embodiment of the same could be used.

A further possibility for configuration and placement of individual components of the production facility 1 would also consist in that the fundamental structure provides for a bending press 3, a tool storage unit 30, and a tool manipulation device 31. In addition to this, at least one or more units for temporary tool storage could then be disposed or provided on the side of the tool manipulation unit 31 that faces away from the bending press 3. This unit or these units for temporary tool storage can then serve to already take out multiple sets of bending tools 4 for the subsequent bending processes from the tool storage unit 30, for example while bending processes are being carried out, and to set down each prepared set of the compiled tool sets of the bending tools 4 in a separate intermediate storage rail of the unit for temporary tool storage or of the units for temporary tool storage. However, the unit or units for temporary tool storage can also serve to temporarily store those components of the bending tool 4 that are no longer required by the bending press 3, and to be able to take them from there again, and set them down in the tool storage unit 30 in a correspondingly sorted sequence.

The exemplary embodiments show possible embodiment variants, wherein it should be noted at this point that the invention is not restricted to the specifically shown embodiment variants of the same, but rather diverse combinations of the individual embodiment variants with one another are also possible, and this variation possibility lies within the ability of a person skilled in the art of this technical field, on the basis of the teaching for technical action provided by the present invention.

The scope of protection is determined by the claims. However, the description and the drawings should be referred to for an interpretation of the claims. Individual characteristics or combinations of characteristics from the different exemplary embodiments that are shown and described can represent independent inventive solutions in themselves. The task underlying the independent inventive solutions can be derived from the description.

All information regarding value ranges in the present description should be understood to mean that they comprise any and all partial ranges of them, for example the statement 1 to 10 should be understood to mean that all partial ranges, proceeding from the lower limit 1 and the upper limit 10 are also included, i.e. all partial ranges begin with a lower limit of 1 or greater and end at an upper limit of 10 or less, for example 1 to 1.7, or 3.2 to 8.1, or 5.5 to 10.

For the sake of good order, it should be pointed out, in conclusion, that for a better understanding of the structure, elements of the production facility 1, in particular its tool storage system 32, were shown partly not to scale and/or larger and/or smaller in size.

REFERENCE SYMBOL LIST 1 production facility
2 workpiece
3 bending press
4 bending tool
5 bending punch
6 bending die
7 machine frame
8 base plate
9 side jaw
10 side jaw
11 transverse bracing
12 front face surface
13 pressing beam
14 front face surface
15 linear guide
16 pressing beam
17 face surface
18 face surface
19 tool holder
20 tool holder
21 drive arrangement
22 drive means
23 power network
24 control device
25 input terminal
26 spindle drive
27 setting means
28 recess
29 recess
30 tool storage unit
31 tool manipulation unit
32 tool storage system
33 transfer device
34 upper storage rail
35 lower storage rail
36 upper tool manipulation device
37 lower tool manipulation device
38 upper working rail
39 upper auxiliary rail
40 upper drawing-in device
41 upper pushing-out device
42 lower working rail
43 lower auxiliary rail
44 lower drawing-in device
45 lower pushing-out device
46 upper longitudinal guide arrangement
47 lower longitudinal guide arrangement
48 first lower guide track
49 second lower guide track
50 lower construction unit
51 lower coupling device
52 lower locking means
53 lower slide piece
54 setting finger
55 provisioning unit
56 upper provisioning rail
57 lower provisioning rail
58 lower pusher
59 first lower coupling element
60 second lower coupling element
61 lower setting means
62 upper setting means
63 first upper guide track
64 second upper guide track
65 upper construction unit
66 upper coupling device
67 upper locking means
68 upper slide piece
69 upper pusher
70 first upper coupling element
71 second upper coupling element
72 upper turning device
73 lower turning device

The invention claimed is:

1. A tool storage system (32) for a production facility (1) for free-form bending of workpieces (2) made from a metal sheet by means of a bending press (3), the tool storage system (32) comprising:
at least one tool storage unit (30) for holding at least one bending tool (4), wherein the at least one bending tool (4) has at least one bending punch (5) and at least one bending die (6),
at least one tool manipulation unit (31),
at least one provisioning unit (55) having at least an upper and/or lower provisioning rail (56, 57), wherein
the at least one tool storage unit (30) comprises at least one upper storage rail (34) and at least one lower storage rail (35), wherein the at least one upper storage rail (34) and the at least one lower storage rail (35) are disposed spaced apart from one another at a vertical distance, as well as locally fixed in place relative to one another, and wherein the at least one upper storage rail (34) defines an upper storage plane, and the at least one lower storage rail (35) defines a lower storage plane,
the at least one tool manipulation unit (31) has at least one upper tool manipulation device (36) and at least one lower tool manipulation device (37), wherein the at least one upper tool manipulation device (36) is disposed in the region of a face side of the at least one upper storage rail (34), and the at least one lower tool manipulation device (37) is disposed in the region of a face side of the at least one lower storage rail (35),
the at least one upper tool manipulation device (36) comprises at least one upper working rail (38) and at least one upper auxiliary rail (39) disposed laterally relative to the former and running parallel with regard to the at least one upper working rail (38), and furthermore comprises at least one upper drawing-in device (40) for the at least one bending punch (5) to be held as well as at least one upper pushing-out device (41) for the at least one bending punch (5) to be discharged,
the at least one lower tool manipulation device (37) comprises at least one lower working rail (42) and at least one lower auxiliary rail (43) disposed laterally relative to the former and running parallel with regard to the at least one lower working rail (42), and furthermore comprises at least one lower drawing-in device (44) for the at least one bending die (6) to be held, as well as at least one lower pushing-out device (45) for the at least one bending die (6) to be discharged,
the at least one upper tool manipulation device (36) can be displaced parallel with regard to the upper storage plane, as well as in a vertical direction with regard to the longitudinal expanse of the at least one upper storage rail (34) along an upper longitudinal guide arrangement (46), and
the at least one lower tool manipulation device (37) can be displaced parallel with regard to the lower storage plane, as well as in the vertical direction with regard to the longitudinal expanse of the at least one lower storage rail (35) along a lower longitudinal guide arrangement (47).

2. The tool storage system (32) according to claim 1, wherein the at least one upper storage rail (34) comprises multiple upper storage rails (34) and the at least one lower storage rail (35) comprises multiple lower storage rails (35), and the upper storage rails (34) and the lower storage rails (35) are oriented to run parallel to one another in the upper and lower storage planes respectively, wherein the upper and lower storage planes defined by the respective storage rails (34, 35) each have a horizontal orientation.

3. The tool storage system (32) according to claim 1, wherein the upper longitudinal guide arrangement (46) has at least one first upper guide track (63) and at least one second upper guide track (64).

4. The tool storage system (32) according to claim 3, wherein the at least one upper working rail (38) and the at least one upper auxiliary rail (39) of the at least one upper tool manipulation device (36) form an upper construction unit (65), and the upper construction unit (65) can be displaced on the at least one first upper guide track (63) of the upper longitudinal guide arrangement (46) by means of a drive.

5. The tool storage system (32) according to claim 4, wherein at least one upper coupling device coupler (66) is provided between the upper construction unit (65) and the at least one upper drawing-in device (40).

6. The tool storage system (32) according to claim 4, wherein the at least one upper pushing-out device (41) is disposed on the upper construction unit (65), and has an upper slide piece (68) that can be displaced in a direction of the longitudinal expanse of the at least one upper working rail (38) as well as the at least one upper auxiliary rail (39), and at least one setting finger (54) is disposed on the upper slide piece (68), wherein the at least one setting finger (54) can be changed from a working position, in which it is in engagement with the at least one bending punch (5), into a rest position in which it is out of engagement with the at least one bending punch (5).

7. The tool storage system (32) according to claim 6, wherein a first upper coupler (70) is disposed on the upper slide piece (68), and said first upper coupler (70) can be brought into a coupling position in which it is in engagement with a second upper coupler (71) disposed on an upper pusher (69).

8. The tool storage system (32) according to claim 4, wherein an upper pusher (69) is mounted so as to be guided on the upper construction unit (65), in the parallel direction with regard to the at least one upper working rail (38), wherein the upper pusher (69) can be changed from an extended position in which it projects beyond the upper construction unit (65) in a direction toward the tool storage unit (30), into a rest position in which it is situated within the upper construction unit (65).

9. The tool storage system (32) according to claim 3, wherein the at least one upper drawing-in device (40) of the at least one upper tool manipulation device (36) can be displaced on the at least one second upper guide track (64) of the upper longitudinal guide arrangement (46).

10. The tool storage system (32) according to claim 3, wherein the at least one upper drawing-in device (40) has at least one upper lock (61), and the at least one upper drawing-in device (40) is held locally fixed in position when the at least one upper lock (67) is situated in a locking position with regard to the at least one second upper guide track (64) of the upper longitudinal guide arrangement (46).

11. The tool storage system (32) according to claim 1, wherein at least one upper setting means (62), which is embodied as a drive wheel, an intermediate wheel, an idler wheel, or a guide wheel, is disposed on the at least one upper working rail (38) and/or the at least one upper auxiliary rail (39), and wherein the at least one upper setting means (62) is disposed in an end region of the at least one upper working rail (38) and/or the at least one upper auxiliary rail (39), which end region faces the tool storage unit (30).

12. The tool storage system (32) according to claim 1, wherein the lower longitudinal guide arrangement (47) has at least one first lower guide track (48) and at least one second lower guide track (49).

13. The tool storage system (32) according to claim 12, wherein the at least one lower working rail (42) and the at least one lower auxiliary rail (43) of the at least one lower tool manipulation device (37) form a lower construction unit (50), and the lower construction unit (50) can be displaced on the at least one first lower guide track (48) of the lower longitudinal guide arrangement (47) by means of a drive.

14. The tool storage system (32) according to claim 13, wherein at least one lower coupler (51) is provided between the lower construction unit (50) and the at least one lower drawing-in device (44).

15. The tool storage system (32) according to claim 13, wherein the at least one lower pushing-out device (45) is disposed on the lower construction unit (50), and has a lower slide piece (53) that can be displaced in a direction of the longitudinal expanse of the at least one lower working rail (42) as well as the at least one lower auxiliary rail (43), and at least one setting finger (54) is disposed on the lower slide piece (53), wherein the at least one setting finger (54) can be changed from a working position, in which it is situated in engagement with the at least one bending die (6), into a rest position, in which it is situated out of engagement with the at least one bending die (6).

16. The tool storage system (32) according to claim 15, wherein a first coupler (59) is disposed on the lower slide piece (53), and said first lower coupler (59) can be brought into a coupling position in which it is in engagement with a second lower coupling element (60) disposed on a lower pusher (58).

17. The tool storage system (32) according to claim 13, wherein a lower pusher (58) is mounted on the lower construction unit (50) so as to be guided in the parallel direction with regard to the at least one lower working rail (42), wherein the lower pusher (58) can be changed from an extended position in which it projects beyond the lower construction unit (50) in a direction toward the tool storage unit (30), into a rest position in which it is situated within the lower construction unit (50).

18. The tool storage system (32) according to claim 12, wherein the at least one lower drawing-in device (44) of the at least one lower tool manipulation device (37) can be displaced on the at least one second lower guide track (49) of the lower longitudinal guide arrangement (47).

19. The tool storage system (32) according to claim 12, wherein the at least one lower drawing-in device (44) has at least one lower lock (52), and the at least one lower drawing-in device (44) is held locally fixed in position when the at least one lower lock (52) is situated in a locking position relative and with regard to the at least one second lower guide track (49) of the lower longitudinal guide arrangement (47).

20. The tool storage system (32) according to claim 1, wherein at least one lower setting means (61), which is embodied as a drive wheel, an intermediate wheel, an idler wheel, or a guide wheel, is disposed on the at least one lower working rail (42) and/or the at least one lower auxiliary rail (43), and wherein the at least one lower setting means (60)

is disposed in an end region of the at least one lower working rail (42) and/or the at least one lower auxiliary rail (43), which end region faces the tool storage unit (30).

21. A production facility (1) for free-form bending of workpieces (2) made from a metal sheet, the production facility (1) comprising:
   at least one bending press (3), and
   the tool storage system (32) according to claim 1.

22. A method for manipulation of at least one bending tool (4) in a production facility (1) for freeform bending of workpieces (2) made from a metal sheet by means of a bending press (3), the method comprising:
   providing a tool storage system (32), the tool storage system (32) having:
   at least one tool storage unit (30) for holding the at least one bending tool (4), the at least one bending tool comprising at least one bending punch (5) and at least one bending die (6),
   at least one tool manipulation unit (31), and at least one provisioning unit (55) having at least one upper and/or lower provisioning rail (56, 57), wherein
   the at least one tool storage unit (30) comprises at least one upper storage rail (34) and at least one lower storage rail (35), and the at least one upper storage rail (34) and the at least one lower storage rail (35) are disposed spaced apart from one another at a vertical distance, as well as locally fixed in place relative to one another, wherein an upper storage plane is defined by the at least one upper storage rail (34), and a lower storage plane is defined by the at least one lower storage rail (35),
   the at least one tool manipulation unit (31) has at least one upper tool manipulation device (36) and at least one lower tool manipulation device (37), wherein the at least one upper tool manipulation device (36) is disposed in the region of a face side of the at least one upper storage rail (34), and the at least one lower tool manipulation device (37) is disposed in the region of a face side of the at least one lower storage rail (35),
   the at least one upper tool manipulation device (36) comprises at least one upper working rail (38) and at least one upper auxiliary rail (39) disposed laterally relative to the former and running parallel with regard to at least one the upper working rail (38), and the upper tool manipulation device (36) furthermore comprises at least one upper drawing-in device (40) for the at least one bending punch (5) to be held, as well as at least one upper pushing-out device (41) for the at least one bending punch (5) to be discharged,
   the at least one lower tool manipulation device (37) comprises at least one lower working rail (42) and at least one lower auxiliary rail (43) disposed laterally relative to the former and running parallel with regard to the at least one lower working rail (42), and the lower tool manipulation device (37) furthermore comprises at least one lower drawing-in device (44) for the at least one bending die (6) to be held, as well as at least one lower pushing-out device (45) for the at least one bending die (6) to be discharged,
   the at least one upper tool manipulation device (36) can be displaced parallel with regard to the upper storage plane, as well as in a vertical direction with regard to the longitudinal expanse of the at least one upper storage rail (34) along an upper longitudinal guide arrangement (46),
   the at least one lower tool manipulation device (37) can be displaced parallel with regard to the lower storage plane, as well as in the vertical direction with regard to the longitudinal expanse of the at least one lower storage rail (35) along a lower longitudinal guide arrangement (47),
   the method further comprising:
   manipulating the at least one bending tool (4) between the at least one tool storage unit (30) and the at least one provisioning unit (55) with the at least one tool manipulation unit (31),
   assembling the at least one bending tool (4) from multiple bending punches (5) of the at least one bending punch (5) and from multiple bending dies (6) of the at least one bending die (6) by means of the at least one lower tool manipulation device (37) and the at least one upper tool manipulation device (36) independent of one another, in each instance, wherein
   at least one required and selected bending punch (5) is displaced to the at least one upper working rail (38) by means of the at least one upper tool manipulation device (36), from one of the at least one upper storage rail (34), wherein at least one bending punch (5) that is not required is displaced to the at least one upper auxiliary rail (39), from the one of at least one of the upper storage rail (34) by means of the at least one upper tool manipulation device (36),
   and/or at least one required and selected bending die (6) is displaced to the at least one lower working rail (42) by means of the at least one lower tool manipulation device (37), from one of the at least one lower storage rails (35), wherein at least one bending die (6) that is not required is displaced to the at least one lower auxiliary rail (43), from the one of at least one of the lower storage rail (35), by means of the at least one lower tool manipulation device (37).

* * * * *

UNITED STATES PATENT AND TRADEMARK OFFICE
CERTIFICATE OF CORRECTION

PATENT NO. : 10,987,715 B2  
APPLICATION NO. : 16/099864  
DATED : April 27, 2021  
INVENTOR(S) : Cavicchia et al.

Page 1 of 1

It is certified that error appears in the above-identified patent and that said Letters Patent is hereby corrected as shown below:

On the Title Page

Item [73], should read:
-- TRUMPF Maschinen Austria GmbH & Co. KG. --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*